Sept. 27, 1938.                H. S. COE                    2,131,166
                         ORE LEACHING APPARATUS
                    Filed March 22, 1937         3 Sheets-Sheet 1
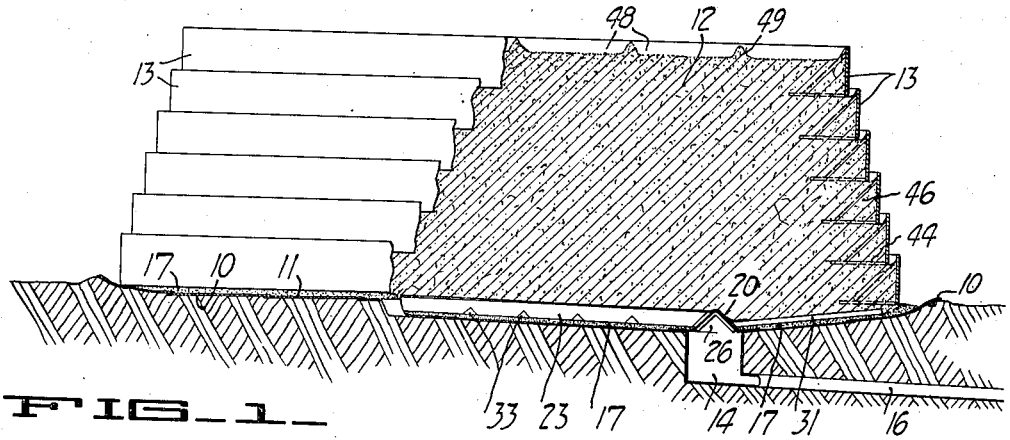
FIG_1_
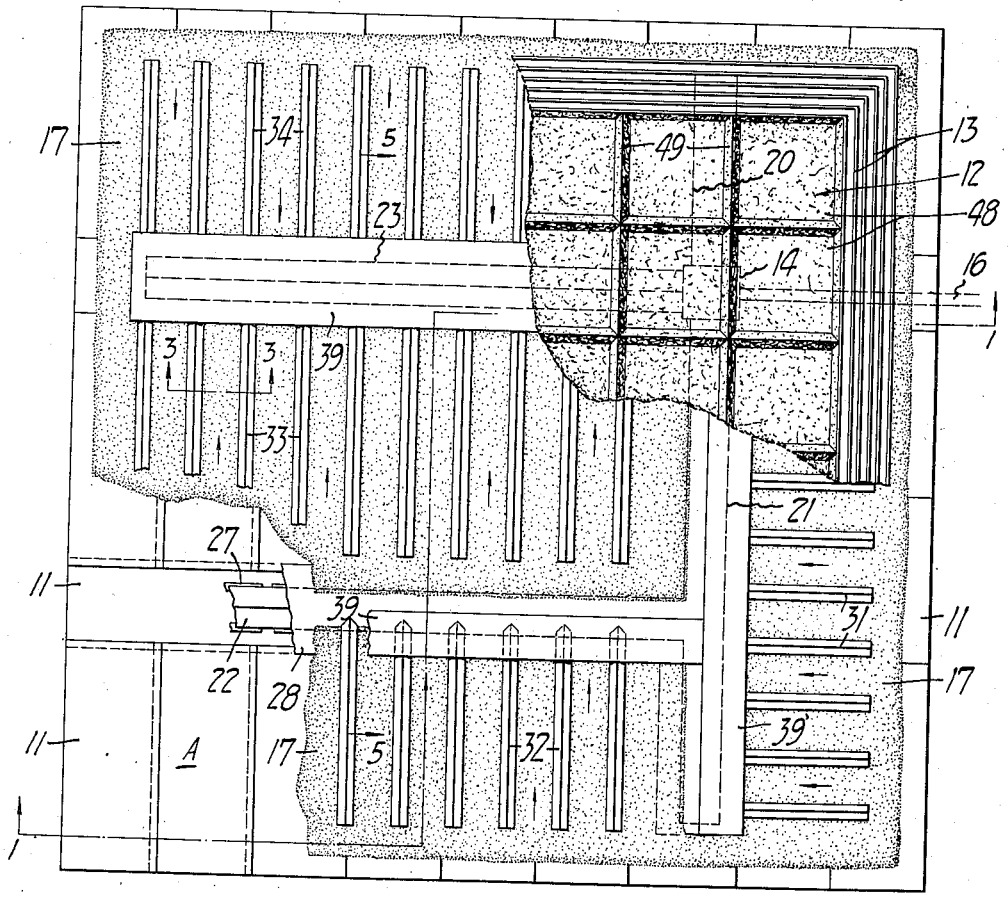
FIG_2_
INVENTOR.
Harrison S. Coe
BY
ATTORNEY.

Sept. 27, 1938.                      H. S. COE                         2,131,166
                             ORE LEACHING APPARATUS
                            Filed March 22, 1937                   3 Sheets-Sheet 2
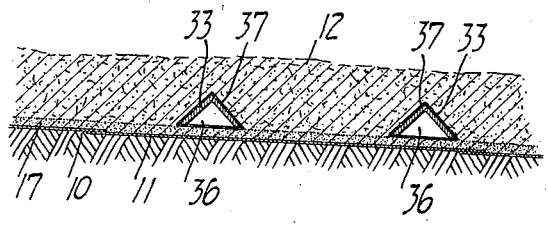
FIG_3_
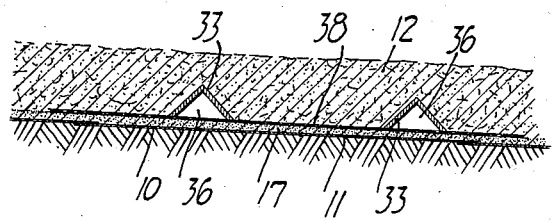
FIG_4_
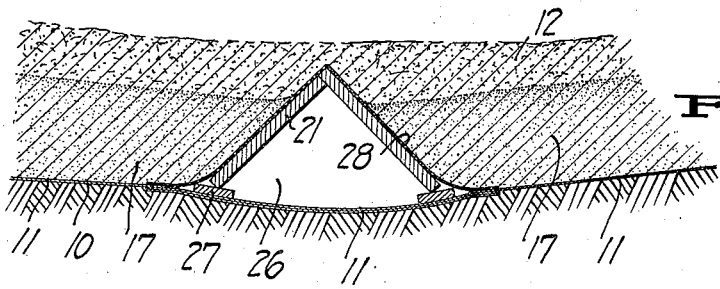
FIG_6_
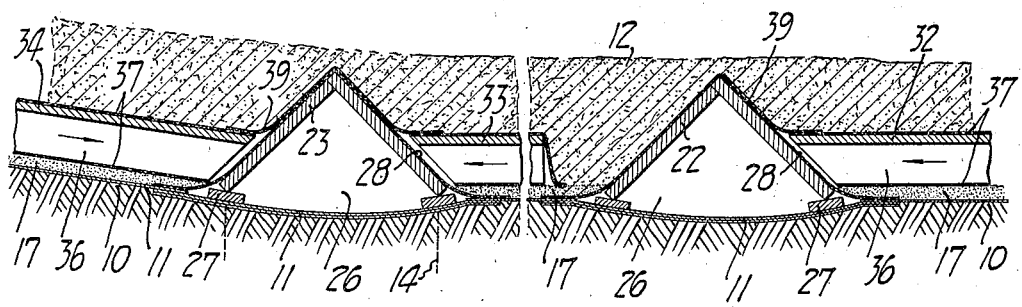
FIG_5_
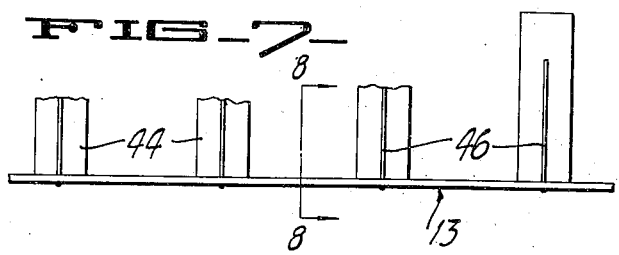
FIG_7_
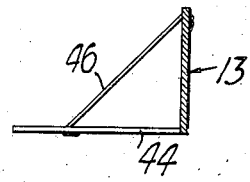
FIG_8_
INVENTOR.
Harrison S. Coe
BY
Paul D. Flehr
ATTORNEY.

Sept. 27, 1938.                    H. S. COE                    2,131,166
                            ORE LEACHING APPARATUS
                          Filed March 22, 1937          3 Sheets-Sheet 3
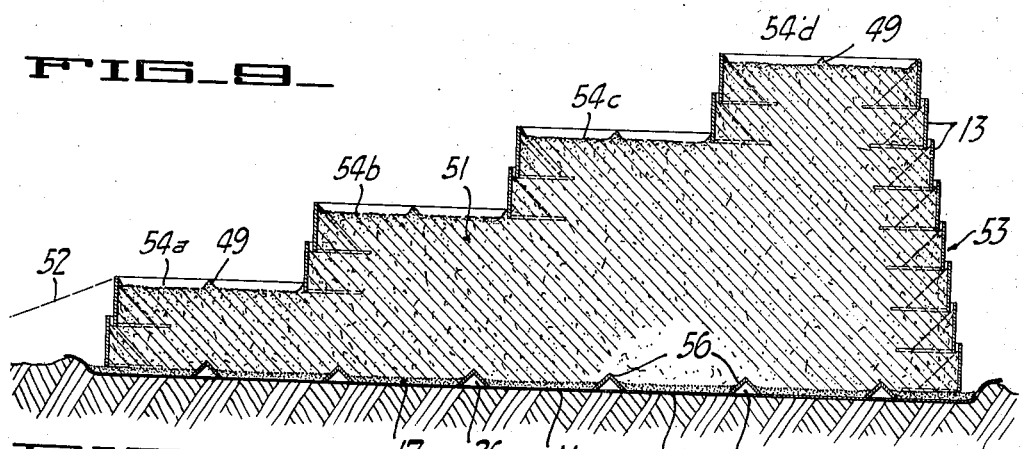
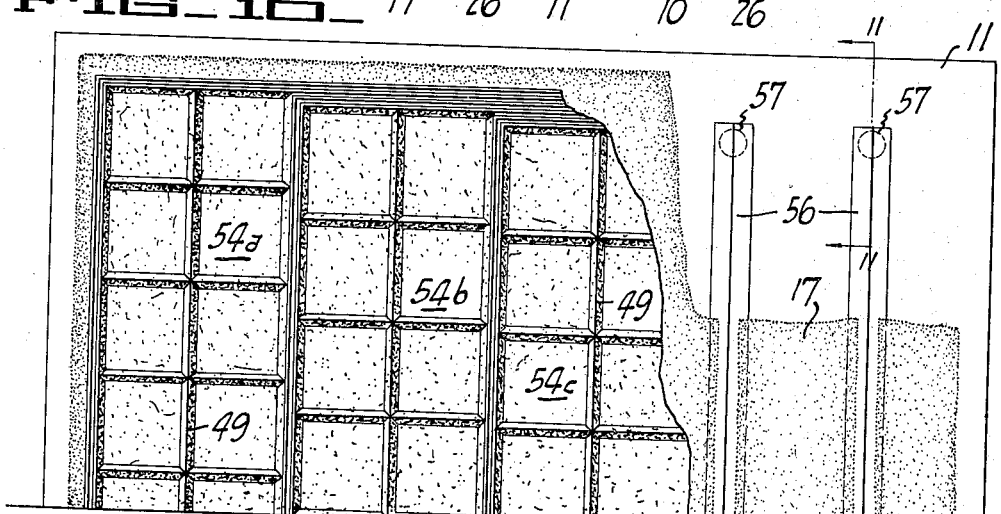
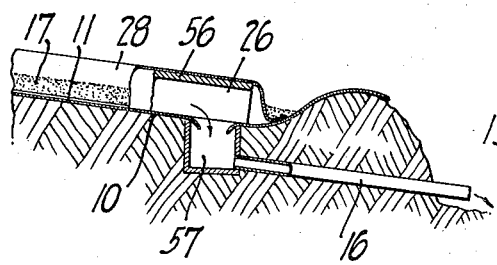
INVENTOR.
Harrison S. Coe
BY
ATTORNEY.

Patented Sept. 27, 1938

2,131,166

UNITED STATES PATENT OFFICE 2,131,166

ORE LEACHING APPARATUS

Harrison S. Coe, Palo Alto, Calif.

Application March 22, 1937, Serial No. 132,320

6 Claims. (Cl. 23—272)

This invention relates generally to the recovery of values from ores. More particularly it relates to leaching systems and methods, wherein a mass of properly comminuted ore is subjected to the action of a solvent liquid applied to its upper surface, and which as it passes down through the mass of ore dissolves and transports the desired values, and is finally recovered as a filter effluent from which the desired values are removed.

It is a general object of the invention to provide a leaching system and method making possible the treatment of large quantities of ore, without the use of conventional leaching tanks, thus making possible low cost recovery of values, with a minimum amount of equipment and invested capital. In carrying out my system and method, a type of leaching is employed wherein the treatment is carried out with a large part of the mass of ore in a sub-saturated condition, and which has been termed "trickle leaching".

Another object of the invention is to provide a novel system or apparatus wherein the preparation of a large bed of ore for treatment is facilitated, and which will afford adequate drainage of effluent from all parts of the bed.

Referring to the drawings:

Fig. 1 is a side elevational view, partly in cross-section, showing apparatus in accordance with the present invention.

Fig. 2 is a plan view of the apparatus shown in Fig. 1, with parts removed from various areas, for the sake of clarity.

Fig. 3 is a cross-sectional view taken along the line 3—3 of Fig. 2, and on an enlarged scale.

Fig. 4 is a view similar to Fig. 3, but showing a possible modification.

Fig. 5 is a cross-sectional detail taken along the line 5—5 of Fig. 2, and on an enlarged scale.

Fig. 6 is a cross-sectional detail similar to the right hand portion of Fig. 5, but showing a possible modification.

Fig. 7 is a plan view of one of the wall sections, used in supporting the sides of the ore bed.

Fig. 8 is a cross-sectional view taken along the line 8—8 of Fig. 7.

Fig. 9 is a side elevational view in cross-section, showing a modified form of ore bed.

Fig. 10 is a plan view of the arrangement shown in Fig. 9, portions being broken away.

Fig. 11 is a cross-sectional detail taken along the line 11—11 of Fig. 10.

The present invention makes use of a membrane placed upon a prepared ground surface, and upon which an extended bed of ore is placed. Novel means are provided, overlying the membrane and at the bottom of the ore bed, for adequately draining away effluent from all parts of the bed and into a suitable effluent receiving means. The leaching solution is applied progressively to different sections of the top of the bed, in such a manner that all parts of the mass are adequately contacted with the leaching solution, the degree of saturation within the ore mass being properly controlled to afford maximum leaching efficiency with a minimum amount of solution.

Referring now to Figs. 1 and 2 of the drawings, there is shown a prepared ground surface 10, which is covered by a membrane 11 and sloped to form a shallow pan. Above this membrane is an ore bed 12, the sides of which are sustained by the wall sections 13. Container 14 is for the purpose of receiving effluent, and connects with the drainage pipe 16.

As a desirable material for forming the membrane 11, I make use of an inexpensive material which may be somewhat permeable to liquids under substantial pressure, but which is practically impervious to liquids under relatively low pressure heads. I have particular reference to sheets of impregnated fibrous material, as for example asphaltic impregnated roofing felt. Strips of this material are shown laid over the prepared ground surface, with overlapping edges (see area A of Fig. 2). The side edges of the prepared ground area are shown provided with raised curbs over which the strips of felt may extend.

To enable drainage of effluent from all parts of the bottom of the bed, I preferably make use of a porous layer 17 (Fig. 1 and middle stippled area of Fig. 2) of suitable material, such as coarse filter sand, or granular ore solids substantially free of slime particles. This porous layer is laid directly upon the membrane 11, and is interposed between the membrane and the bottom of the ore bed. A porous layer of this character enables lateral flow of liquid trickling down from the ore bed, in a direction depending upon the slope of the underlying ground surface. In addition to the porous layer 17, I preferably make use of a system of drainage conduits into which solution seeping through the porous layer 17, may flow. Thus primary drainage troughs 20, 21, 22 and 23 are provided, which can be formed substantially as illustrated in Figs. 5 and 6. Each trough is disposed in an inverted position, to form a drainage passage 26 within the porous layer 17. Spaced strips 27 (Figs. 2 and 5) are shown inserted under the lower edges of the troughs, in order to prevent damage to underlying areas of the membrane 11.

In order to prevent entrance of sand or ore solids into passages 26, porous material such as strips of cloth or burlap 28 can be placed over the troughs, with the edges of the strips underlying the porous bed 17. In the arrangement of Fig. 6 the porous layer 17 is of substantial depth in order to avoid the use of secondary drainage troughs or conduits underlying the ore bed. However, in the arrangement of Figs. 1, 2 and 5, the porous layer 17 is say from ½ to 2 inches thick, and secondary drainage troughs 31 to 34 inclusive, are provided. These troughs are placed in inverted position upon the porous layer 17. To prevent entrance of solids into the passages 36, afforded by these troughs, the troughs can be wrapped with burlap 37 (Fig. 3), or like porous medium. An alternative arrangement is illustrated in Fig. 4, in which the secondary troughs are laid upon burlap strips 38, overlying the porous layer 17.

Fig. 5 also shows an intersection between a primary trough, and a secondary trough formed as shown in Fig. 3. Thus a portion 39 of burlap is shown laid over troughs 22 and 23 and the adjacent ends of troughs 32, 33 and 34. Solution draining through passages 36 can therefore readily find its way into the passages 26, and sand or solids can not block such communication. It will be evident that other structural details can be provided, to afford a conduit drainage system commensurate with the extent of the ore bed.

The side wall sections 13 are formed as illustrated in Figs. 7 and 8. Each wall section is provided with inwardly extending anchoring surfaces 13, which are braced by a webbing 46. As the ore is applied these wall sections are placed in position, and the weight of the bed of ore upon anchoring members 13, retains them in proper position to withstand side pressure. It will be noted that the wall sections are not only spaced vertically, but are also offset laterally, whereby treatment liquid passing downwardly through the ore bed, may not ooze from the side walls.

The top surface of the ore bed is preferably divided into a number of compartments 48, by means of small dams 49. In practice the compartments 48 can be about 4 inches in depth, and they serve to receive the treatment solution, as will be presently explained.

In preparing the apparatus described above to form a bed of ore to be treated, the procedure is as follows:—A suitable ground area is smoothed and sloped towards convenient centers of drainage, where the effluent container 14 is provided. Along areas where drainage troughs are to be laid, the ground may be hollowed out somewhat, substantially as illustrated in Fig. 5. This prepared ground surface is now covered with strips of asphaltic impregnated roofing felt, with the edges of the strip overlapping. A double thickness of roofing felt can be laid over the areas upon which the primary troughs are to be placed. Strips 11 are now laid in proper positions, and the primary troughs placed upon these strips. A layer of coarse filter sand, or granular ore solids substantially free of slime particles, is now applied over the asphaltic impregnated roofing felt, to a thickness of say ½ of an inch. The surface of this porous layer can then be covered with burlap strips, and the secondary troughs applied, or the secondary troughs can be wrapped in burlap and then laid upon the layer of sand, substantially as previously described. Burlap is also placed over the ends of the secondary troughs to complete the drainage system.

Suitable comminuted ore to be leached is now placed upon the drainage system. In handling large quantities of ore suitable land moving machines, such as tractors equipped with bulldozers, can be employed. As the depth of the bed builds up, the sectional walls are placed in position, to form the side walls in the manner previously described. After formation of the bed has been completed the surface is levelled and the dams 49 formed, to afford the compartments 48. The apparatus is now ready for the leaching operation, which may be carried out more or less continuously over a period of several days, or several weeks, depending upon the size of the ore body, and other factors.

Since the invention has been used with good results upon the extraction of gold and silver values by means of an alkaline cyanide solution, the leaching operation will be described with reference to solution of this character. It should be pointed out however that in using cyanide solution for extracting gold and silver, provision must be made for maintaining alkalinity of the solution, and this can best be done by mixing dry lime with the comminuted ore, at the time the ore bed is prepared.

The operator now floods the compartments 48 successively and in predetermined order, with predetermined quantities of the cyanide solution. In the flooding of compartments and during the initial period of absorption, the surface of the ore is stirred or agitated to cause a suspension of the finer material and the formation of a surface cake. This will serve to avoid channelling of the solution, or flow of the solution downwardly through shrinkage cracks, and in general will afford proper penetration and uniform downward penetration such as is conducive to efficient extraction.

Each charge of solution applied to a particular compartment or section of the ore bed, is much less than that required to completely saturate the bed of ore for its entire depth. For example where a bed of ore is about 8 feet in depth, good results are secured by applying the solution in charges which will form a temporary solution pool of say one inch depth on the surface of the bed, the charges being applied two or three times each twenty-four hours. More specifically, in treating an 8 foot bed of ore having a total surface area of 2,300 square feet, divided into sections or compartments each having an area of about 256 square feet, good results have been secured by applying about 15 tons of cyanide solution per day, applied progressively to the various sections, with each section receiving two washes per day.

Application of solution in the manner described above produces a novel and efficient type of leaching. In practice no drainage will occur from the bottom of the bed until several charges of solution have been applied. After the entire depth of the ore bed has been wetted, a drainage of the leaching solution takes place into the porous bed 17, laterally through bed 17 under troughs 31 to 34 inclusive, then into the passages 36, and from thence into the primary troughs to the effluent container 14. The application of a charge of solution to the wetted bed, causes formation of a substantially saturated zone or strata, which progresses downwardly through the ore bed. By a substantially saturated zone I have reference to one in which voids and interstices are substantially filled with solution whereby there is very little if any capillary effect. The boundaries of this zone, as it progresses downwardly through the ore bed are not sharply defined, since there is a region of transition from this zone to adjacent regions of subsaturation. By subsaturation I have reference to the presence of a solution to an extent insufficient to fill the larger voids. Under such conditions drainage is retarded or minimized by capillary effects from above and is accelerated by said effect from below said saturated zone. Therefore the saturated zone moves downward under the action of gravity on its fluid content, at a rate determined by the laws of frictional flow under pressure. Since one factor determining the pressure in a saturated zone is the depth of the zone, which in turn is governed directly by the depth of solution applied in one application, the rate of movement of the more highly saturated zones in the bed is subject to control by controlling the amount of solution in the charge which forms the same. Because of the relatively small amount of solution used for each charge and because of the time interval intervening between successive charges, the zone can be pictured as a strata of substantially complete saturation travelling slowly down through the ore bed, and having a general depth which is a minor fraction of the total depth of the ore bed, as for example a strata about one foot in depth where the ore bed is eight feet in height. Where the ore bed is of sufficient depth the charges of solution can be and preferably are applied at such intervals as to have two or more of such zones moving downwardly through the ore, and separated by a region or regions of subsaturation.

The significance of the above, with respect to leaching efficiency, is that solution in the downwardly moving zones of complete saturation, displaces the fluid adhering to particles in the underlying regions of subsaturation, which solution contains values leached from the ore. A condition of subsaturation is conducive to efficient leaching action, due to presence of air in the interstices, and other factors favorable to dissolution of values.

When a zone of complete saturation reaches the lower portion of the ore bed it causes a small fluid head upon the membrane 11, which is not sufficient to occasion any material leakage, but which is sufficient to cause lateral flow of effluent into the drainage system. The slope afforded for the ground surface on which the ore bed is placed, prevents building up of fluid heads at any point on the membrane 10, and particularly in regions along the sides of the bed. Thus the pan afforded by the sloped ground surface can be comparatively shallow, and the edges of this pan, formed in this instance by curb 15, need only be of sufficient height to avoid any spillover of solution. In practice the sides of the ground surface can be relatively low, and in no event need be greater than the depth of the previously mentioned zones of complete saturation.

Pebbles and granules from the overlying porous layer 17, are pressed into the upper surface of the asphaltic impregnated roofing felt, thus in effect materially reducing the area of the roofing felt which is directly exposed to the solution. This serves to materially reduce any tendency for the solution to leak through the felt in addition to the fact that the felt itself is relatively impervious under low fluid heads.

By utilizing the apparatus and method of this invention all conventional leaching tanks are unnecessary and at the same time there is no material sacrifice in the efficiency of extraction and recovery of desired values. A minimum amount of labor is required, and the ore moving operations can be carried out by standard and readily available machinery. The asphaltic impregnated roofing felt or like sheeting employed for the membrane 11, is relatively inexpensive, but highly practical for the purposes desired. Overlaps between strips of this material afford tight seals irrespective of irregularities of the ground surface on which the strips are laid. Likewise the flexibility and "give" afforded by such material precludes tearing in conforming to irregularities, and avoids formation of wrinkles of such a character as to permit leakage between the overlapped edges of the strips.

It will be evident that the drainage system can be modified to suit various conditions or requirements. For example effluent may not be delivered to effluent sump 14, but may be delivered to one or more pipes or launders, leading to the exterior of the ore bed. Also in certain instances all sides of the ore bed may not require support, in which event the wall sections 13 may be used on say only two sides of the bed.

A modification is illustrated in Figs. 9 and 10, which is particularly convenient when handling large amounts of ore with a tractor and bulldozer. In moving the ore to the bed 51, a ramp 52 is employed and the tractor and bulldozer operate over this ramp to dump successive charges of ore. Instead of building up a bed of uniform depth, the ore is deposited to provide an inclined ramp-like surface over which the tractor operates. By way of illustration the back side of the bed may be built up to from 10 to 20 feet in depth, while the front side may be from 5 to 10 feet in depth. As the ore is deposited, wall sections are put in place to form a back wall 53, and to also form side walls. The top surface is then terraced and additional walls installed to form the different surface levels 54a, 54b, 54c and 54d. The dams 49 are then provided as in Fig. 1.

The ground surface for the modified arrangement of Figs. 9 and 10 can be sloped in any desired direction, provided the slope is such as to cause lateral flow of solution to one or more points of removal of effluent. The drainage system can be simplified to constitute merely troughs or like members 56, corresponding to the troughs 21 of Fig. 6, and which connect with the separate sumps 57.

It will be evident that the arrangement of Figs. 9 and 10 is well adapted for treatment of large masses of readily friable ore solids, such as tailings which previously have been treated by recovery processes, and which can be readily moved upon a prepared ground surface by bulldozer equipment.

I claim:

1. In a leaching system of the character described, a bed of ore of substantial depth, and a plurality of wall sections forming at least one side wall of the bed, the sections being spaced vertically and staggered laterally, each section being provided with anchoring elements extending into the interior of the bed, whereby each section is self-supporting.

2. In a leaching system of the character described, a sloped ground surface, a substantially impervious membrane laid thereon, a bed of porous granular material disposed on said membrane, and a drainage channel embedded in said granular material and positioned substantially parallel with and adjacent to said membrane.

3. In a leaching system of the character described, a sloped ground surface terminating at its periphery in a curb, a substantially impervious membrane disposed on said surface and extending to the top of said curb, a bed of porous granular material laid upon said membrane, a drainage channel embedded in said granular material and positioned substantially parallel with and adjacent to said membrane, fluid conducting means disposed beneath said membrane and passing outward under said curb, and a vent in said membrane communicating with the fluid conducting means.

4. In an apparatus for the leaching of ore, a supporting ground surface, a substantially impervious membrane extending above said ground surface, a layer of porous granular material above said impervious layer, and drainage channels spaced at intervals through said pervious layer and above said impervious layer.

5. In an apparatus for the leaching of ore, a sloped ground surface, a substantially impervious membrane extending above said ground surface, a layer of porous granular material above said impervious layer, and drainage channels spaced at intervals through said impervious layer and above said impervious layer, the ends of certain of said channels terminating near the lowermost portion of the impervious layer.

6. In an ore leaching system of the character described, a sloped ground surface terminating in a curb, a substantially impervious membrane extending above said ground surface, a layer of porous material above said impervious layer, drainage channels forming passages spaced at intervals through said pervious layer and above said impervious layer, and a drainage conduit communicating with said drainage channels and positioned below the upper rim of said curb.

HARRISON S. COE.